United States Patent [19]

Ali

[11] Patent Number: 5,022,864

[45] Date of Patent: Jun. 11, 1991

[54] EQUIPMENT FOR DELIVERING A FLUID

[75] Inventor: Eren Ali, Bristol, United Kingdom

[73] Assignee: Nomix Manufacturing Company Limited, Bristol, United Kingdom

[21] Appl. No.: 410,135

[22] Filed: Sep. 20, 1989

[30] Foreign Application Priority Data

Sep. 20, 1988 [GB] United Kingdom ............... 8822078
May 25, 1989 [GB] United Kingdom ............... 8910404

[51] Int. Cl.⁵ ............................................. H01R 4/60
[52] U.S. Cl. ................................... 439/192; 439/478
[58] Field of Search ............................. 439/190–198, 439/624, 478; 239/690–703, 223, 224

[56] References Cited

U.S. PATENT DOCUMENTS

| | | |
|---|---|---|
| 360,925 | 4/1887 | Solano . |
| 2,109,511 | 3/1938 | Simon . |
| 2,388,445 | 11/1945 | Stewart . |
| 2,811,674 | 10/1957 | Smith . |
| 2,883,513 | 4/1959 | Schnabel . |
| 3,097,288 | 6/1963 | Dunlap . |
| 3,184,113 | 5/1965 | Curtis . |
| 3,343,723 | 9/1967 | Richards ............... 439/194 |
| 3,452,931 | 7/1969 | Knowles . |
| 3,539,103 | 11/1970 | Marsh . |
| 3,741,244 | 6/1973 | Ise . |
| 3,749,814 | 7/1973 | Pratt . |
| 4,083,497 | 4/1978 | Rosenberger . |
| 4,107,452 | 8/1978 | Razvi . |
| 4,401,326 | 8/1983 | Blair . |
| 4,487,437 | 12/1984 | Dickerson . |
| 4,537,457 | 8/1985 | Davis, Jr. et al. .............. 439/190 |
| 4,609,148 | 9/1986 | Gill . |

FOREIGN PATENT DOCUMENTS

| | | |
|---|---|---|
| 086030 | 8/1983 | European Pat. Off. . |
| 0110713 | 6/1984 | European Pat. Off. . |
| 2251709 | 12/1977 | France . |
| 2363673 | 3/1978 | France . |
| 106120 | 12/1953 | New Zealand . |
| 114427 | 11/1957 | New Zealand . |
| 120050 | 11/1958 | New Zealand . |
| 150941 | 12/1967 | New Zealand . |
| 148193 | 4/1969 | New Zealand . |
| 179125 | 5/1977 | New Zealand . |
| 583398 | 6/1984 | Switzerland . |
| 901969 | 7/1962 | United Kingdom . |
| 1046065 | 10/1966 | United Kingdom . |
| 1440866 | 6/1976 | United Kingdom ............... 439/194 |
| 2045883 | 11/1980 | United Kingdom . |
| 2091365 | 7/1982 | United Kingdom . |
| 2136321 | 4/1984 | United Kingdom . |
| 2131327 | 6/1984 | United Kingdom . |
| 2160279 | 12/1985 | United Kingdom . |

*Primary Examiner*—David L. Pirlot
*Attorney, Agent, or Firm*—Merchant & Gould

[57] ABSTRACT

Equipment for delivering a fluid, such as herbicide, comprises a carrier (2) in the form of a handset and a support tube (4) which is connected to the carrier (3) and carries a distribution head. A supply duct (6) conveys herbicide from the carrier to the distribution head, and electrical leads (8) provide a connection between a battery, mounted in the carrier, and a motor in the distribution head. The support tube (4) has a connector (10) which is secured to the carrier by a screwthreaded sleeve. A spigot (18) of the connector 10 enters a bore in a valve to provide sealed connection between the valve and the supply duct (6). First contacts (28) on the connector (10) engage second contacts (42) in the carrier to provide electrical connections. The support tube (4) can thus be coupled to the carrier (2) by a simple plug in operation.

10 Claims, 3 Drawing Sheets

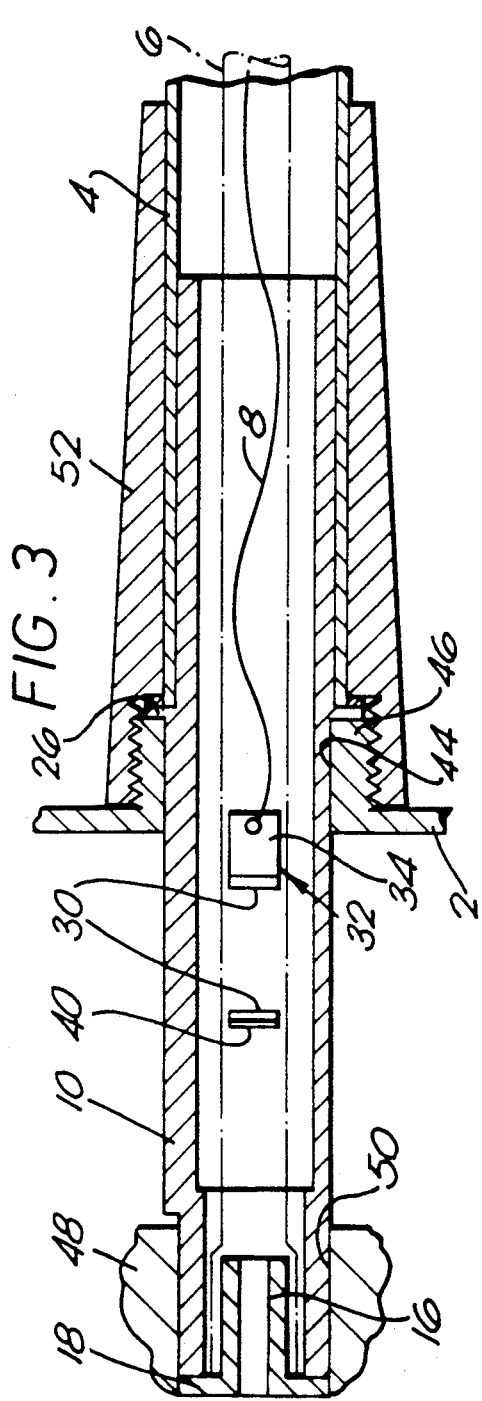
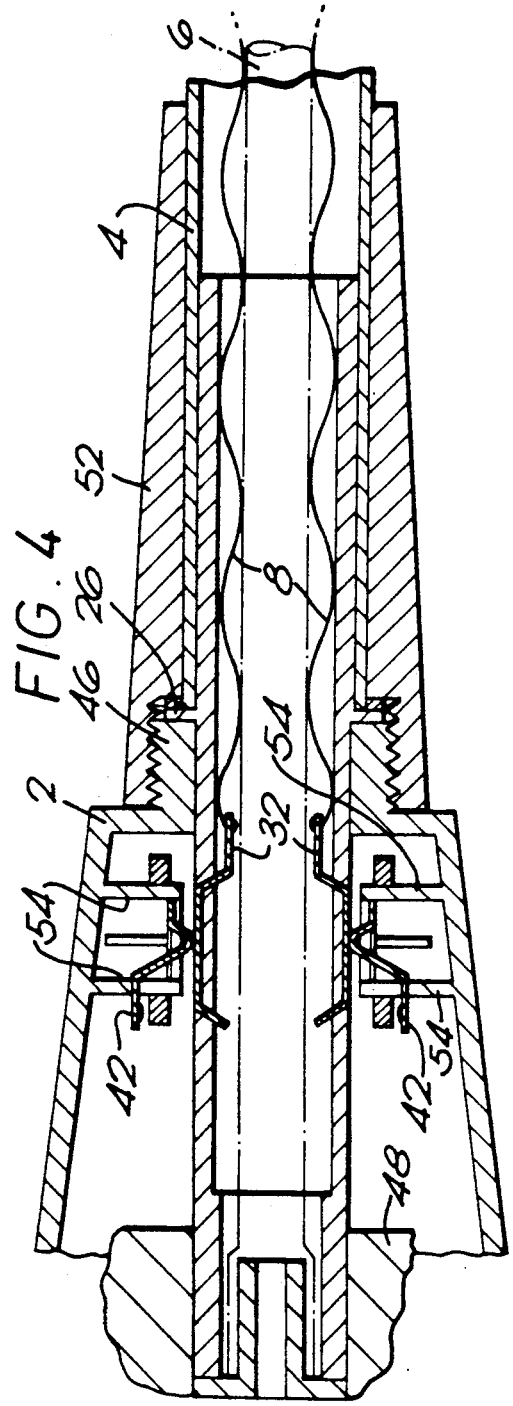

EQUIPMENT FOR DELIVERING A FLUID

This invention relates to equipment for delivering a fluid, and is particularly, although not exclusively, concerned with equipment for delivering herbicides, and other plant treatment materials, over the ground.

Herbicide delivery equipment is known which comprises a handset to which a delivery head is connected by a tubular support. Such equipment is disclosed, for example, in European Patent Specification No. 0300763.

In operation, an operator holds the handset in such a way that the delivery head is positioned just above the ground. Operation of the equipment is controlled by means of control devices provided in the handset. Such control devices may comprise, for example, a valve for controlling the flow of fluid to the head, and electrical control devices controlling the supply of electric power to, for example, an electric motor provides in the head for driving a delivery disc to distribute the material.

The tubular support may accommodate both a supply duct, for conveying the fluid, and one or more electrical leads for providing the electrical connections. It is therefore necessary, when assembling the equipment, not only for the tubular support to be fixed securely to the handset, but for the appropriate fluid and electrical connections to be made. These separate operations are both difficult and time consuming, not only during the initial manufacture of the equipment, but also during subsequent servicing, for example if the tubular support is damaged and needs to be replaced.

According to the present invention, there is provided equipment for delivering a fluid, comprising a carrier and a delivery head connected to the carrier by a support tube which accommodates a supply duct, for conveying fluid from the carrier to the delivery head, and an electrical lead extending between the carrier and the delivery head, the support tube being provided, at the end adjacent the carrier, with a connector which makes sealing contact with a fluid supply element provided in the carrier, the connector having a first contact element, which is connected to the electrical lead and is exposed to the exterior of the connector, and the carrier having a second contact element which resiliently engages the first contact element, the connector being releasably connected to the carrier.

The connector is preferably connected rigidly to the carrier. In a preferred embodiment, the connector is connected to the carrier by means of a coupling element which engages a shoulder provided on the connector and is releasably secured to the carrier, for example by a screwthreaded connection.

The carrier may comprise a casing assembled from two parts, each of which includes part of a screwthreaded boss which is engaged by the coupling element. Consequently, the coupling element, when fitted to the carrier, holds the parts of the boss together, thereby assisting in retaining the two parts of the casing together.

The supply element provided in the carrier may be a valve, and the connector may comprise a spigot which sealingly engages a bore provided in the valve. The engagement between the spigot and the bore may be such as to prevent rotation of the spigot, and therefore of the support tube, relatively to the valve. A sealing element may be provided between the spigot and the bore. The radially outer periphery of the sealing element is preferably nearer to the longitudinal axis of the connector than the outer surface of the first contact element.

There may be wiping means on the connector between the spigot and the first contact element in order to wipe the second contact element, as the connector is engaged with the carrier, before the first contact element makes contact with the second contact element.

The first contact element may comprise a connector portion disposed in the interior of the connector, and a contact portion disposed on the exterior of the connector. The two portions may be joined to one another by an intermediate portion which extends through an opening in the wall of the connector. At the end of the contact portion away from the connector portion, there may be an end portion which extends through a further opening in the wall of the connector.

The second contact element preferably comprises a resilient blade which is biassed into engagement with the first contact.

In a preferred embodiment of the equipment, the connector is permanently secured to the support tube, for example by means of an adhesive.

For a better understanding of the present invention, and to show how it may be carried into effect, reference will now be made, by way of example, to the accompanying drawings, in which:

FIG. 3 is a sectional view of an alternative embodiment of such a connection; and FIG. 4 is a sectional view of the embodiment shown in FIG. 3, taken in a plane perpendicular to that of FIG. 3.

Figure 1:
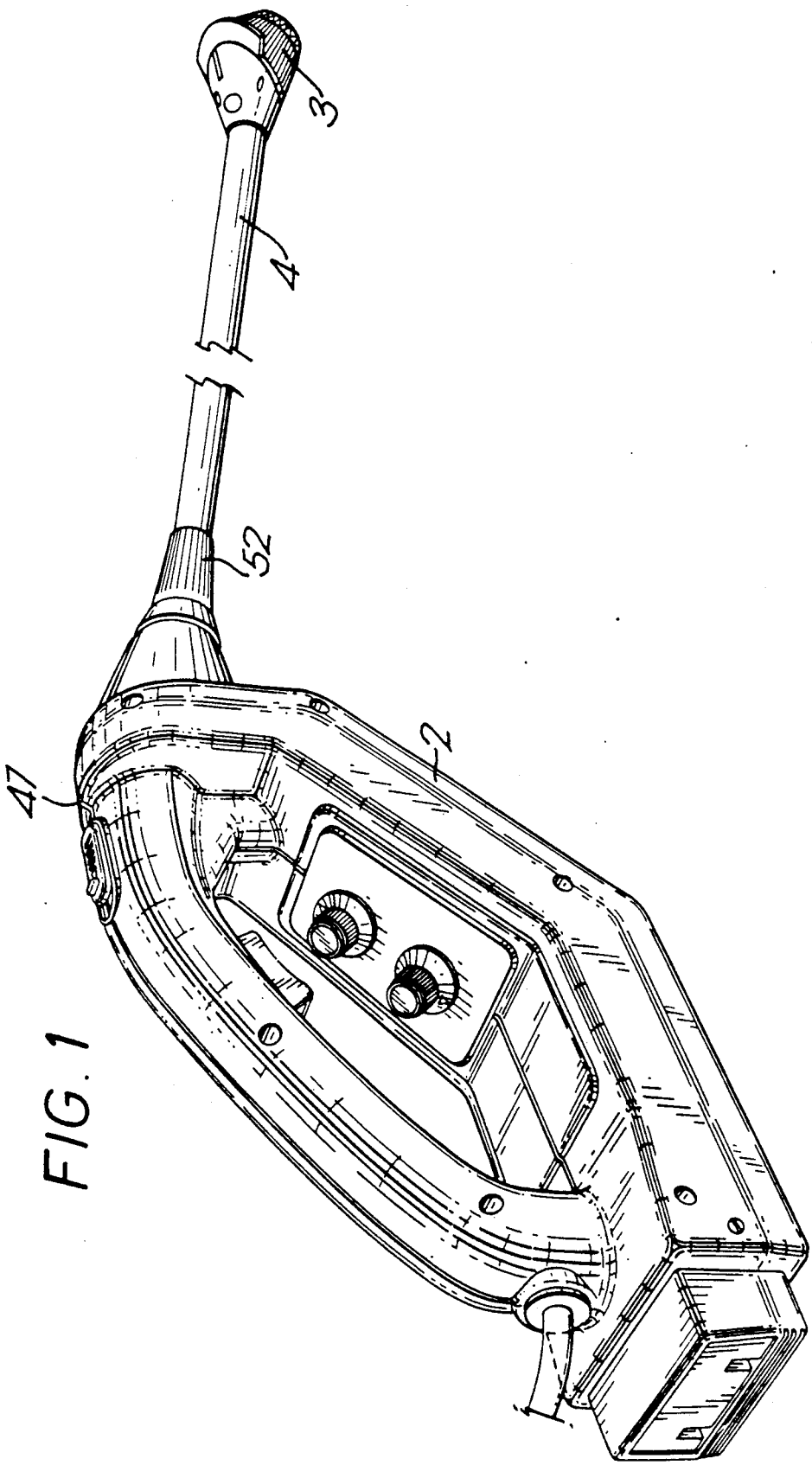
FIG. 1 shows herbicide delivery equipment.

Referring to FIG. 1, the equipment comprises a carrier in the form of a handset 2, and a support tube 4. At the end away from the handset 2, the support tube 4 carries a delivery head 3 from which herbicide is delivered in use.

Figure 2:
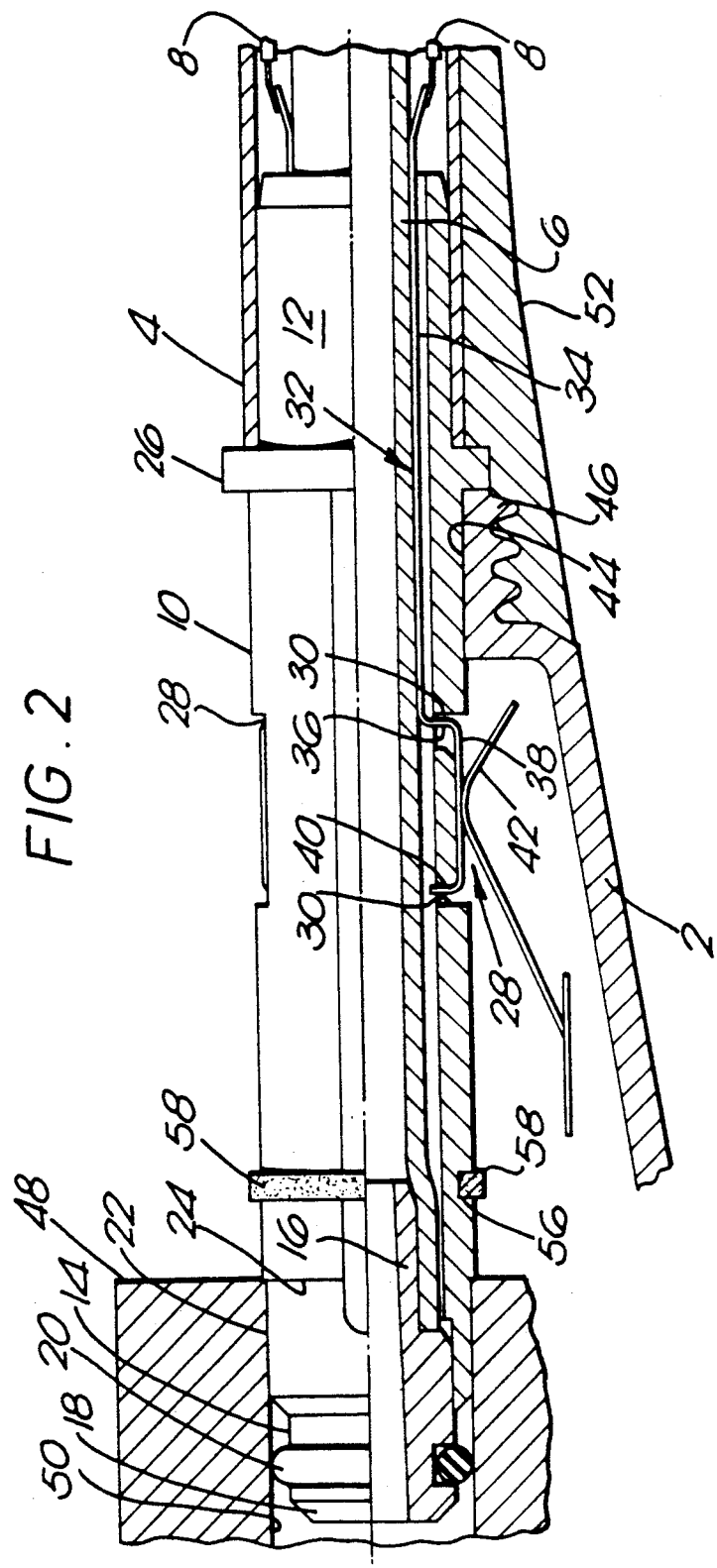
FIG. 2 is a partly sectioned view showing the connection between a support tube and a carrier of the herbicide delivery equipment of FIG. 1.

As shown in FIG. 2, the support tube 4 accommodates a supply duct 6 and electrical leads 8. At the end shown in FIG. 1, the support tube 4 is provided with a connector 10 which includes a plug portion 12 fixed within the support tube 4, for example by means of an adhesive. The connector 10 is hollow, and is provided, at the end away from the plug portion 12, with an insert 14. The insert 14 is also hollow and has a connector portion 16 which receives the free end of the supply duct 6. The insert 14 has a spigot 18 receiving an O-ring 20. The outer periphery of the spigot 18, including the O-ring 20, is of smaller diameter than the adjacent outer surface 22 of the connector 10, which surface 20 terminates at a shoulder 24.

The main body of the connector 10 is separated from the plug portion 12 by a circumferential projection 26, and has two oppositely disposed recesses 28. Each recess is connected at opposite ends to the interior of the connector 10 by slots 30. Each recess 28, and the associated slots 30, receive a first contact element 32. The contact element 32 has a connector portion 34 which extends within the connector 10 and is attached, for example by soldering, to a respective one of the leads 8. At the end away from the respective lead 8, the connector portion 34 is connected by an intermediate portion 36 to a contact portion 38. The intermediate portion 36 extends through one of the slots 30, and an end portion 40 of the contact portion 32 projects into the other slot 30. The contact portion 38 lies in the recess 28, and is exposed to the outside of the connector 10.

The casing 2 accommodates a valve 48 which includes an outlet bore 50 within which the head 18 and the surface 22 are accommodated. The surface 22 may comprise, for example, a keyway for cooperation with a corresponding key provided in the bore of the valve to ensure that the connector 10, and consequently the support tube 4, are retained by the casing 2 in the correct orientation.

The casing 2 also supports a pair of second contacts 42, only one of which is shown in FIG. 2. Each second contact 42 comprises a resilient blade which is biassed into engagement with the contact portion 38 of the respective first contact 32.

Between the shoulder 24 and the first contact 32, the connector has a groove 56 within which a wiping element, for example a felt washer 58, is situated.

The support tube 4, with the attached connector 10, constitutes a unit which can be inserted into the casing 2 through an opening 44. As the connector 10 is inserted, the O-ring 20, because of its reduced diameter, can pass between the second contacts 42 without touching them. However, even if the contacts 42 are touched by the O-ring 20, or are otherwise contaminated, they are wiped by the washer 58 before the contacts 32 reach them, so ensuring good electrical contact.

When the unit is fully inserted, the spigot 18 is disposed within the bore 41 in the valve, and the O-ring 20 makes sealing contact with the wall of the bore so that fluid delivered by the valve passes through the insert 14 to the supply duct 6. Similarly, the second contact elements 42 make electrical contact with the contact portions 38 of the first contacts 32, so that electrical power can be conducted from a source within the casing 2 to the leads 8. Thus, both the fluid and electrical connections are made automatically by inserting the connector 10 into the casing 2. When the connector 10 is fully inserted, the projection 26 abuts against the end of a screw threaded boss 46 formed on the casing 2. A coupling element 52 received over the support tube 4 is then screwed on to the boss 46 until it engages the projection 26 so as to secure the support tube 4 and the connector 10 securely on the casing 2.

The casing 2 is formed from two separate parts (see the parting line 47 FIG. 1), each of which provides part of the boss 46. These parts of the boss 46 are then secured firmly together by the coupling element 52 when the equipment is assembled.

FIG. 3 illustrates a slightly modified alternative construction. However, parts which correspond to parts of the embodiment shown in FIGS. 1 and 2 are designated by the same reference numerals.

In the embodiment of FIGS. 3 and 4, the first contact element 32 has a somewhat shorter connecting portion 34, with the result that the connection between the lead 8 and the connecting portion 34 is situated within the interior of the connector 10. To assemble the equipment, the contact element 32 is soldered to the end of the lead 8 before the contact element 32 is located within the slots 30.

As shown in FIG. 4, the resilient contact elements 42 are supported by walls 54 molded integrally with the casing 2.

I claim:

1. Equipment for delivering a fluid, comprising a carrier and a delivery head connected to the carrier by a support tube which accommodates a supply duct, for conveying fluid from the carrier to the delivery head, and an electrical lead extending between the carrier and the delivery head, the support tube being provided, at the end adjacent the carrier, with a connector which makes sealing contact within a bore in a fluid supply element provided in the carrier, the engagement between the spigot and the bore being such as to prevent rotation of the spigot relative to the supply element, the connector having a first contact element, which is connected to the electrical lead and is exposed to the exterior of the connector, and the carrier having a second contact element which resiliently engages the first contact element, the connector being releasably connected to the carrier.

2. Equipment is claimed in claim 1, in which the connector is connected rigidly to the carrier.

3. Equipment as claimed in claim 1, in which the spigot has a smaller diameter than the region of the connector at which the first contact is provided.

4. Equipment as claimed in claim 1, in which the spigot carries a sealing ring for engagement with the bore.

5. Equipment as claimed in claim 1, in which a wiping element is provided on the connector between the spigot and the first contact for wiping the second contact as the support tube is moved into engagement with the carrier.

6. Equipment as claimed in claim 1, in which the connector is connected to the carrier by means of a coupling element which engages a shoulder provided on the connector and is releasably secured to the carrier.

7. Equipment as claimed in claim 6, in which the coupling element is connected to the carrier by a screwthreaded connection.

8. Equipment as claimed in claim 7 in which, the carrier comprises a casing assembled from two parts, each of which includes part of a screwthreaded boss which is engaged by the coupling element.

9. Equipment as claimed in claim 1 in which the first contact element has a connector portion disposed in the interior of the connector, and a contact portion disposed on the exterior of the connector, the two portions being joined to one another by an intermediate portion which extends through an opening in the wall of the connector.

10. Equipment as claimed in claim 9, in which the second contact element comprises a resilient blade which is biassed into engagement with the first contact element.

* * * * *